United States Patent [19]

Kobayashi

[11] Patent Number: 5,531,929
[45] Date of Patent: Jul. 2, 1996

[54] SILICONE ANTIFOAM COMPOSITIONS

[75] Inventor: Hideki Kobayashi, Ichihara, Japan

[73] Assignee: Dow Corning Toray Silicone Co., LTD., Tokyo, Japan

[21] Appl. No.: 287,737

[22] Filed: Aug. 9, 1994

[30] Foreign Application Priority Data

Aug. 26, 1993 [JP] Japan ................... 5-234245

[51] Int. Cl.⁶ ................................. B01D 19/04
[52] U.S. Cl. ............................. 252/321; 252/358
[58] Field of Search .................. 252/321, 358; 106/287.13; 556/435; 528/31

[56] References Cited

U.S. PATENT DOCUMENTS

| | | | |
|---|---|---|---|
| 3,113,930 | 12/1963 | Chevalier | 252/358 |
| 3,235,509 | 2/1966 | Nitzsche et al. | 252/358 |
| 3,666,681 | 5/1972 | Keil | 252/358 |
| 3,746,653 | 7/1973 | Churchfield | 252/321 |
| 4,042,528 | 8/1977 | Abe | 252/321 |
| 4,514,319 | 4/1985 | Kulkarni et al. | 252/321 |
| 4,741,861 | 5/1988 | Okada et al. | 252/358 |
| 5,055,229 | 10/1991 | Pelton et al. | 252/321 |
| 5,087,720 | 2/1992 | Kishita et al. | 556/434 |
| 5,117,025 | 5/1992 | Takago et al. | 556/434 |
| 5,153,258 | 10/1992 | Nakahara et al | 252/358 X |
| 5,192,336 | 3/1993 | Grewal | 44/418 |

FOREIGN PATENT DOCUMENTS

| | | |
|---|---|---|
| 516109 | 12/1992 | European Pat. Off. . |
| 149388 | 11/1979 | Japan . |
| 48211 | 5/1981 | Japan . |
| 69110 | 4/1984 | Japan . |
| 42042 | 7/1992 | Japan . |
| 42043 | 7/1992 | Japan . |

OTHER PUBLICATIONS

Journal of Applied Polymer Science, vol. 40, pp. 789–797, 1990, M. J. Owen et al.

*Primary Examiner*—Richard D. Lovering
*Attorney, Agent, or Firm*—Timothy J. Troy

[57] ABSTRACT

The present invention relates to an antifoam composition comprising a liquid organosilicon polymer and silica micropowder having a specific surface area of at least 50 $m^2/g$. The silicone antifoam composition of the present invention exhibits an excellent and long-lasting antifoam performance under strong alkaline conditions.

20 Claims, No Drawings

SILICONE ANTIFOAM COMPOSITIONS

BACKGROUND OF THE INVENTION

The present invention relates to an antifoam composition. More particularly, the present invention relates to an antifoam composition that exhibits excellent and long-lasting antifoam performance under strong alkaline conditions.

Diorganopolysiloxane based antifoam compositions exhibit an antifoam activity superior to that of antifoam compositions based on materials other than silicone oils, for example, alcohols, polyesters, mineral oils, vegetable oils, and synthetic oils and do so at smaller quantities of addition. For these reasons they are in wide use for breaking and suppressing foam in industries such as the chemical industry, food industry, petroleum industry, textile industry, plastics industry, cement industry, and paint and adhesives industry. However, like antifoam compositions based on material other than silicone oil, under strongly alkaline conditions diorganopolysiloxane-based antifoam compositions exhibit a decline in both the level and persistence of their antifoam activity, which necessitates a continuous or intermittent addition of the antifoam composition.

Numerous antifoam compositions have already been proposed in order to solve this problem. For example, Japanese Patent Application Laid-Open [Kokai or Unexamined] No. 56-48211 [48,211/81] teaches an antifoam composition containing an organopolysiloxane, a polyoxyalkylene-containing organopolysiloxane, silica micropowder, surfactant, and water. Japanese Laid-Open Patent Application Number 59-69110 [69,110/84] teaches an antifoam composition whose base agent is an organopolysiloxane that contains amino-functional organic and oxyalkylene groups. Japanese Patent Publication Number 4-42042 [42,042/92] teaches an antifoam composition containing an organopolysiloxane and silica micropowder whose surface has been treated with a diorganosiloxane oligomer. Japanese Patent Publication Number 4-42043 [42,043/92] teaches an antifoam composition containing an organopolysiloxane, an inorganic ammonium salt compound, and silica micropowder whose surface has been treated with an organosilicon compound. Japanese Laid-Open Patent Application Number 5-184814 [184,814/93] teaches an antifoam composition containing a trimethylsiloxy-terminated dimethylpolysiloxane, a vinyldimethylsiloxy-terminated dimethylpolysiloxane, a dimethylsiloxane-methylhydrogensiloxane copolymer, trimethylsiloxysilicate, silica micropowder, and platinum catalyst.

However, under strongly alkaline conditions these antifoam compositions exhibit an unsatisfactory antifoam activity and also a reduced persistence in antifoam activity due in each case to scission under these conditions of the main chain of the organopolysiloxane base agent in such compositions.

SUMMARY OF THE INVENTION

The present invention relates to an antifoam composition comprising (A) an organosilicon polymer having the general formula:

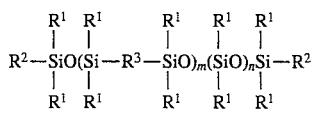

wherein $R^1$ denotes a monovalent hydrocarbon group free of aliphatic unsaturation, $R^2$ is a group selected from the group consisting of hydrogen, monovalent hydrocarbon groups, and a hydroxyl group, $R^3$ denotes an alkylene group, m has a value of at least 2, n has a value of zero or greater than zero with the proviso that m is greater than or equal to n, and (B) silica micropowder having a specific surface area of at least 50 $m^2/g$.

It is an object of the present invention to produce an antifoam composition that exhibits an excellent and long-lasting antifoam activity under strongly alkaline conditions.

These and other features, objects and advantages of the present invention will be apparent upon consideration of the following detailed description of the invention.

DETAILED DESCRIPTION OF THE INVENTION

The organosilicon polymer compound (A) is the base or principal agent of the composition of the present invention, and has the following general formula:

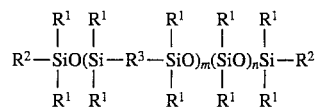

In the above formula $R^1$ denotes monovalent hydrocarbon groups free of aliphatic unsaturation. The group $R^1$ is specifically exemplified by monovalent hydrocarbon groups such as methyl, ethyl, propyl, and butyl, aryl groups such as phenyl, tolyl, and xylyl, and aralkyl groups such as benzyl and phenethyl. Preferred groups for $R^1$ in the compositions of the present invention are methyl and phenyl. In the above formula $R^2$ denotes a group selected from the group consisting of hydrogen, monovalent hydrocarbon groups, and a hydroxyl group. The monovalent hydrocarbon groups of $R^2$ are specifically exemplified by alkyl groups such as methyl, ethyl, propyl, and butyl, alkenyl groups such as vinyl, allyl, butenyl, pentenyl, and hexenyl, aryl groups such as phenyl, tolyl, and xylyl, and aralkyl groups such as benzyl and phenethyl. In the above formula $R^3$ denotes alkylene groups, which are specifically exemplified by ethylene, propylene, butylene, hexylene, trimethylene, 2-methyltrimethylene, pentamethylene, hexamethylene, 3-ethylhexamethylene, octamethylene, $-CH_2(CH_3)CH-$, $-CH_2CH(CH_3)CH_2-$, and $-(CH_2)_{18}-$, cycloalkylene radicals such as cyclohexylene, arylene radicals such as phenylene, and combinations of divalent hydrocarbon radicals such as benzylene. The subscript m in the preceding formula indicates the degree of polymerization for the silalkylenesiloxane unit and is an integer with a value of at least 2. The subscript n indicates the degree of polymerization for the diorganosiloxane unit and is an integer with a value of zero or greater than zero. The subscript m must have a value at least as large as that of n or a value greater than n.

The viscosity of component (A) is not specifically restricted as long as component (A) is a liquid at ambient temperature. However, the viscosity at 25° C. is preferably 5 to 50,000 centistokes and it is particularly preferred that the viscosity ranges between 100 to 10,000 centistokes at 25° C. because this facilitates preparation of the compositions of the present invention. Component (A) is specifically exemplified by liquid organosilicon polymers with having the following general formulas:

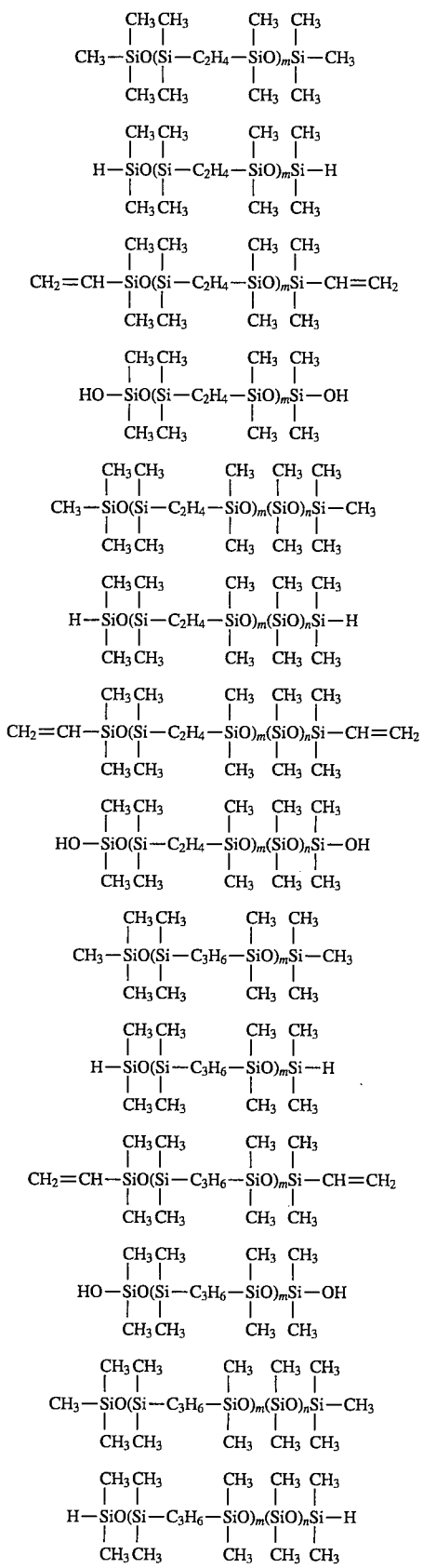
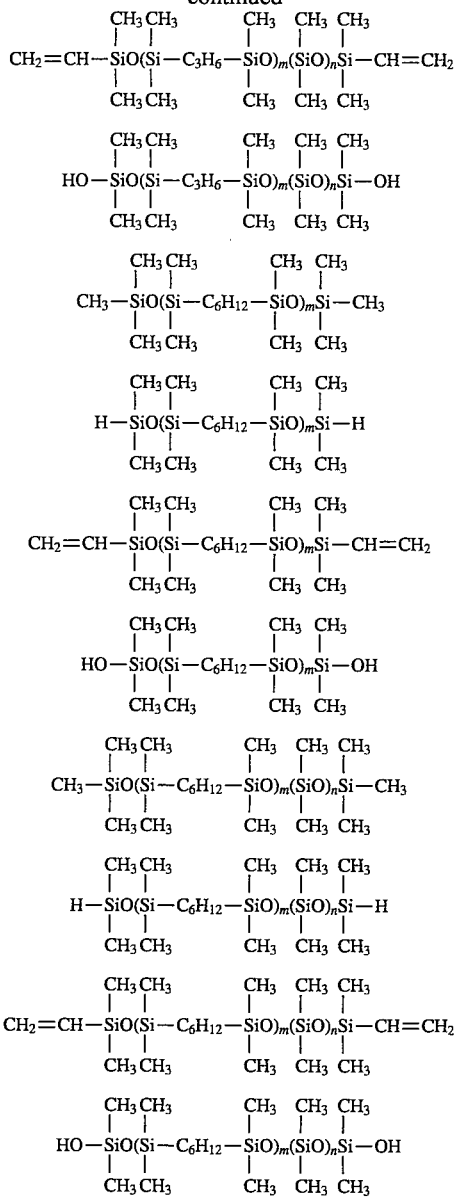

The subscripts m and n in the preceding formulas are defined as delineated hereinabove.

The method for the synthesis of component (A) in the compositions of the present invention is not specifically restricted in scope. Examples of methods for the synthesis of component (A) include: (i) an addition reaction in the presence of a platinum catalyst between a 1,3-dihydrogendisiloxane (such as 1,1,3,3-tetramethyldisiloxane and 1,3-dimethyl-1,3-diphenyldisiloxane) and a 1,3-dialkenyldisiloxane (such as 1,1,3,3-tetramethyl-1,3-divinyldisiloxane, 1,1,3,3-tetramethyl-1,3-diallyldisiloxane, and 1,3-dimethyl-1,3-diphenyl-1,3-divinyldisiloxane), (ii) an addition reaction in the presence of a platinum catalyst between an SiH-terminated polysilalkylenesiloxane and a vinyl-terminated dimethylpolysiloxane, (iii) an addition reaction in the presence of a platinum catalyst between a vinyl-terminated polysilalkylenesiloxane and an SiH-terminated dimethylpolysiloxane, (iv) a condensation reaction in the presence of a condensation reaction catalyst between a silanol-terminated polysilalkylenesiloxane and a dimethylpolysiloxane terminated by a silanol group or silicon-bonded hydrogen group, and (v) an addition reaction in the presence of a platinum catalyst between an alpha,omega-dihydrogensiloxane oligomer (such as 1,1,3,3,5,5-hexamethyltrisiloxane and 1,1,3,3,5,5,7,7-octamethyltetrasiloxane) and an alpha,omega-dialkenylsiloxane oligomer (such as 1,1,3,3-tetramethyl-1,3-divinyldisiloxane, 1,1,3,3,5,5-hexamethyl-1,5-divinyltrisiloxane, and 1,1,3,3,5,5,7,7-octamethyl-1,7-divinyltetrasiloxane).

The silica micropowder (B) functions to equip the compositions of the present invention with an excellent and long-lasting antifoam activity under strong alkaline conditions. While component (B) is not specifically restricted as to type, its specific surface area must be at least 50 $m^2/g$ and is preferably at least 100 $m^2/g$. This is because a component (B) with a specific surface area below 50 $m^2/g$ has a substantially reduced dispersibility in component (A) and the resulting composition therefore has a reduced antifoam activity. The subject component (B) is specifically exemplified by fumed silica, calcined silica micropowder, precipitated silica micropowder, silica aerogel, quartz micropowder, and fused silica micropowder.

Although component (B) as described above may be directly added to component (A), component (B) may also be added after its surface has been rendered hydrophobic by treating the silica using various organosilanes or organosiloxane oligomers, or by blending the organosilane or organosiloxane oligomer into the system during the blending of component (B) into component (A). Component (B) can be treated with any of the organosilanes and organosiloxane oligomers known for this purpose. The organosilanes suitable for rendering the surface of the silica hydrophobic are exemplified by dimethyldichlorosilane, hexamethyldisilazane, and dimethyldialkoxysilane. The organosiloxane oligomers suitable for rendering the surface of the silica hydrophobic are exemplified by silanol-terminated dimethylsiloxane oligomers, trimethylsiloxy-terminated methylhydrogensiloxane oligomers, 1,1,3,3-tetramethyldisiloxane, and 1,3,5,7-tetramethylcyclotetrasiloxane.

Component (B) is added to the compositions of the present invention in the range of 1 to 50 weight parts per 100 weight parts component (A). The antifoam activity and the persistence of the antifoam activity are reduced when component (B) is present at less than 1 weight part per 100 weight parts component (A). At the other extreme, the preparation of a homogeneous antifoam composition becomes highly problematic when component (B) is present at more than 50 weight parts per 100 weight parts component (A).

The antifoam composition in accordance with the present invention is prepared by mixing components (A) and (B) as described hereinabove to homogeneity. The technique for preparing the compositions of the present invention is not particularly restricted in scope and is exemplified by (i) mixing components (A) and (B) to homogeneity, (ii) gradually adding the specified quantity of component (B) to component (A) while stirring component (A), (iii) mixing component (B) to homogeneity into a portion of component (A) and then mixing the residual portion of component (A) into the resulting blend, and (iv) first preparing a homogeneous composition from components (A) and (B) and then heating this composition to 30° C. to 200° C. and preferably to 50° C. to 150° C. while stirring. When the compositions of the present invention is to be subjected to a heat treatment during its preparation, a very small quantity of an acidic catalyst, for example, sulfuric acid, is preferably added to the system prior to said heat treatment. While no specific restrictions apply to the equipment used to prepare the compositions of this invention, the compositions are preferably prepared in a heatable and stirrable device. The invention composition can be prepared using, for example, a homomixer, ball mill, colloid mill, or three-roll mill.

In addition to components (A) and (B) as described above, the antifoam composition of the invention may contain other components on an optional basis insofar as the object of the present invention is not impaired, for example, silanes such as organoalkoxysilanes, organohalosilanes, and organosilazanes, metal hydroxide micropowders such as aluminum hydroxide micropowder, calcium hydroxide micropowder, and magnesium hydroxide micropowder, bis amides such as those disclosed in U.S. Pat. No. 5,192,336 incorporated herein by reference to disclose amides suitable for addition to the antifoam compositions of the present invention, polyoxyalkylene modified polydiorganosiloxanes, flake-form fillers such as mica, diorganopolysiloxanes such as diorganopolysiloxane, epoxy-functional diorganopolysiloxanes, and amino-functional diorganopolysiloxanes, as well as pigments and dyes.

The antifoam composition of the invention can be formulated as an organic solvent-based antifoam, water-based emulsion, solid, etc., in accordance with the type of foaming system to be treated. When the foaming system to be treated with the antifoam composition of the present invention is an oil-based or organic solvent-based system, the antifoam composition of the present invention is preferably diluted with organic solvent. No specific restrictions apply to organic solvents usable for this dilution other than the requirement that a homogeneous dispersion of the antifoam composition be obtained. Said organic solvents are exemplified by hydrocarbon organic solvents such as hexane, heptane, octane, methylcyclohexane, xylene, and petroleum naphtha, halohydrocarbon organic solvents such as perchloroethylene, bromochloroethane, and dichlorobutane, amine organic solvents such as triethylamine, butylamine, and tributylamine, alcohol organic solvents such as isopropyl alcohol, butyl alcohol, and amyl alcohol, ether organic solvents such as hexyl ether, butyl Cellosolve, and dioxane, ketone organic solvents such as methyl ethyl ketone, diethyl ketone, and methyl butyl ketone, ester organic solvents such as ethyl acetate, Cellosolve acetate, and ethyl propionate, and carboxylic acid organic solvents such as acetic acid and propionic acid. When the antifoam composition of the invention is to be applied in a water-based foaming system, the antifoam composition is preferably used in the form of the water-based emulsion prepared by emulsifying its blend with water, surfactant, and optionally a protective colloid. The antifoam of the present invention can also be used formulated as a solid powdered antifoam.

In the Examples hereinbelow the viscosity values reported were measured at 25° C. The antifoam activity and the persistence of the antifoam activity were evaluated as follows: Evaluation of the antifoam activity and its persistence value were measured by adding 0.50 g of the antifoam composition into a 100-mL volumetric flask. This was brought to 100 mL by the addition of tert-butanol in order to prepare the tert-butanol dispersion of the antifoam composition. Potassium hydroxide pellets were separately dissolved in a 1.5 weight % aqueous solution of polyoxyethylene octylphenyl ether surfactant (Octapol 100 from Sanyo Kasei Kogyo Kabushiki Kaisha) to prepare an alkaline aqueous dispersion with a pH of 13. 100 mL of this alkaline aqueous dispersion was placed in a 300-mL glass bottle equipped with a lid. The bottle was placed on a shaker and shaken for 10 seconds to induce foaming. This was immediately followed by the addition using a pipette of 1.0 mL of the previously prepared tert-butanol dispersion of the antifoam composition. The time required for disappearance of the foam was measured and scored on the following scale:

++: no more than 10 seconds required for foam disappearance

+: 11 to 20 seconds required for foam disappearance x: more than 21 seconds required for foam disappearance.

The persistence of the antifoam activity was evaluated by continuing the shake test using the sample prepared above and previously tested. The bottle was returned to the shaker, shaken for another 10 seconds in order to induce foaming, and the time until foam disappearance (break time) was again measured. The shake test was repeated until a break time reading of two minutes or greater was observed. The larger the number of shake tests indicates a higher degree of persistance.

EXAMPLE 1

About 100 weight parts of a liquid organosilicon polymer (having a viscosity of about 3,000 centipoise) having the general formula

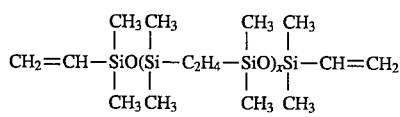

and 10 weight parts precipitated silica micropowder (having a specific surface area of about 300 m²/g) were mixed for 1 hour at room temperature. 0.01 weight parts sulfuric acid was added to the resulting mixture, which was then mixed for 2 hours at 60° C. to afford an antifoam composition in accordance with the present invention. This composition was investigated for its antifoam activity and for the persistence of its antifoam activity as delineated above, and these results are reported in Table 1.

EXAMPLE 2

About 100 weight parts of a liquid organosilicon polymer (having a viscosity of about 200 centipoise) having the general formula

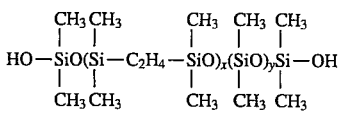

wherein x is an integer with a value of at least 2, y is an integer with a value of at least 1, and the ratio of x to y is about 3 to 1, and 10 weight parts precipitated silica micropowder (having a specific surface area of about 300 m²/g) were mixed for 1 hour at room temperature. The resulting mixture was then mixed for 2 hours at 60° C. to afford an antifoam composition in accordance with the present invention. This composition was investigated for its antifoam activity and for the persistence of its antifoam activity per the methods delineated above, and these results are reported in Table 1.

EXAMPLE 3

About 100 weight parts of a liquid organosilicon polymer (having a viscosity of about 3,000 centipoise) having the general formula

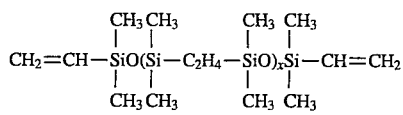

was mixed with 10 weight parts fumed silica micropowder (having a specific surface area of about 200 m²/g) whose surface had been rendered hydrophobic by treatment with hexamethyldisilazane. Next, about 0.01 weight parts sulfuric acid was added to the resulting mixture, which was then mixed for 2 hours at 60° C. After cooling, an antifoam composition in accordance with the present invention was finally obtained by the addition of sodium bicarbonate in a quantity equivalent to the sulfuric acid addition. This composition was investigated for its antifoam activity and for the persistence of its antifoam activity as described above, and these results are reported in Table 1.

Comparative Example 1

An antifoam composition was prepared as in Example 1, but in this case using polydimethylsiloxane having a viscosity of about 3,000 centipoise in place of the liquid organosilicon polymer used in Example 1. This composition was investigated for its antifoam activity and for the persistence of its antifoam activity as described above, and these results are reported in Table 1.

TABLE 1

|  | Invention Examples | | | Comparative Example Comparative |
|---|---|---|---|---|
|  | Example 1 | Example 2 | Example 3 | Example 1 |
| antifoam activity | ++ | ++ | ++ | + |
| persistence of the antifoam activity* | 11 | 9 | 10 | 3 |

* - indicates the number of shake tests required for the break time to reach or exceed 2 minutes.

From Table 1 hereinabove it is clear that the compositions of the instant invention showed excellent and highly persistent antifoam activity under strongly alkaline conditions in contrast to polydimethylsiloxane based antifoam compositions.

That which is claimed is:

1. An antifoam composition comprising:

(A) an organosilicon polymer having the general formula:

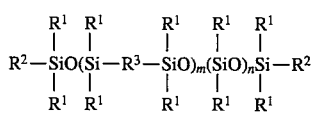

wherein $R^1$ denotes a monovalent hydrocarbon group free of aliphatic unsaturation, $R^2$ is a group selected from the group consisting of hydrogen, monovalent hydrocarbon groups, and a hydroxyl group, $R^3$ denotes an alkylene group, m has a value of at least 2, n has a value of zero or greater than zero with the proviso that m is greater than or equal to n; and (B) silica micropowder having a specific surface area of at least 50 m²/g.

2. A composition according to claim 1, wherein $R^1$ is selected from the group consisting of methyl, ethyl, propyl, butyl, phenyl, tolyl, xylyl, benzyl, and phenethyl.

3. A composition according to claim 2, wherein $R^1$ is selected from the group consisting of methyl and phenyl.

4. A composition according to claim 1, wherein $R^2$ is selected from the group consisting of methyl, ethyl, propyl, butyl, vinyl, allyl, butenyl, pentenyl, hexenyl, phenyl, tolyl, xylyl, benzyl, and phenethyl.

5. A composition according to claim 1, wherein $R^3$ is selected from the group consisting of ethylene, propylene, butylene, hexylene, trimethylene, 2-methyltrimethylene, pentamethylene, hexamethylene, 3-ethyl-hexamethylene, octamethylene, —$CH_2(CH_3)CH$—, —$CH_2CH(CH_3)CH_2$—, —$(CH_2)_{18}$—, cyclohexylene, phenylene, and benzylene.

6. A composition according to claim 1, wherein (A) has a viscosity of between 100 and 10,000 centistokes at 25° C.

7. A composition according to claim 1, wherein (A) is selected from the group consisting of

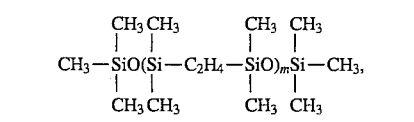
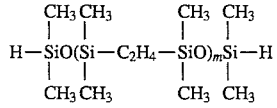
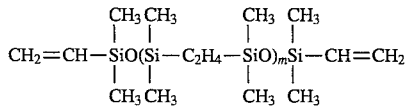
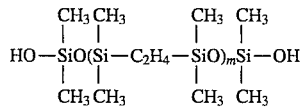
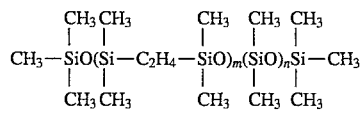
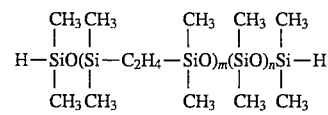
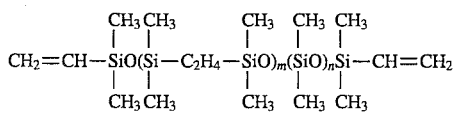
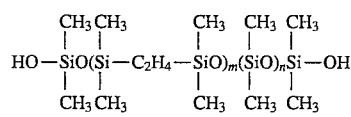
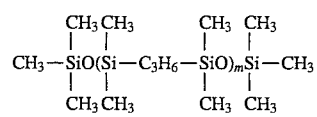
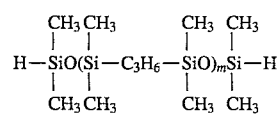
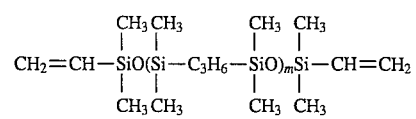
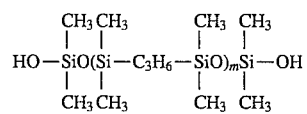
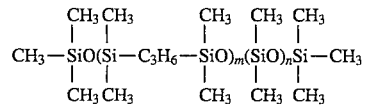
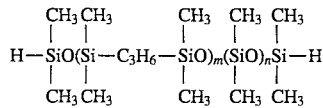
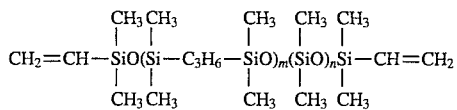
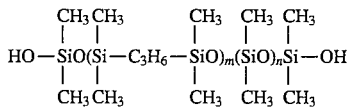
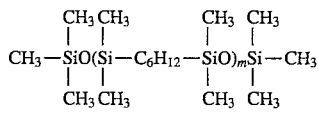
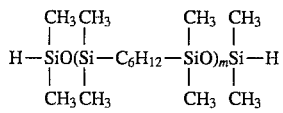
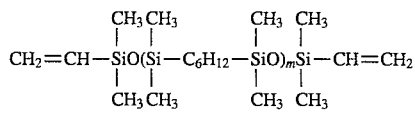
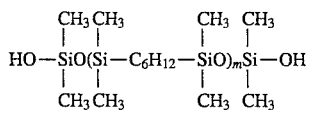
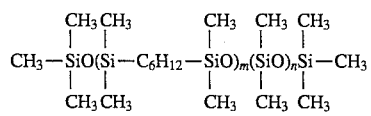
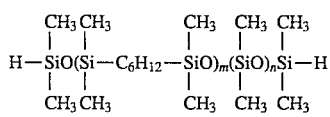
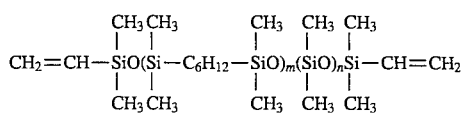

and

-continued

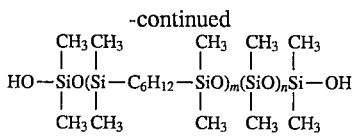

wherein m has a value of at least 2, n has a value of zero or greater than zero with the proviso that m is greater than or equal to n.

8. A composition according to claim 1, wherein (B) is selected from the group consisting of fumed silica, calcined silica micropowder, precipitated silica micropowder, silica aerogel, quartz micropowder, and fused silica micropowder.

9. A composition according to claim 1, wherein the composition further comprises a solvent.

10. A composition according to claim 9, wherein the solvent is selected from the group consisting of hydrocarbon organic solvents, halohydrocarbon organic solvents, amine organic solvents, alcohol organic solvents, ether organic solvents, ketone organic solvents, ester organic solvents, and carboxylic acid organic solvents.

11. A composition according to claim 9, wherein the solvent is selected from the group consisting of hexane, heptane, octane, methylcyclohexane, xylene, petroleum naphtha, perchloroethylene, bromochloroethane, dichlorobutane, triethylamine, butylamine, tributylamine, isopropyl alcohol, butyl alcohol, amyl alcohol, hexyl ether, butyl Cellosolve, dioxane, methyl ethyl ketone, diethyl ketone, and methyl butyl ketone, ethyl acetate, Cellosolve acetate, ethyl propionate, acetic acid, and propionic acid.

12. A composition according to claim 1, wherein the composition further comprises a surfactant and water.

13. A composition according to claim 1, wherein the composition further comprises a compound selected the group consisting of organosilanes and organosiloxane oligomers.

14. A composition according to claim 13, the organosilane is selected from the group consisting of dimethyldichlorosilane, hexamethyldisilazane, and dimethyldialkoxysilane.

15. A composition according to claim 13, wherein the organosiloxane oligomers are selected from the group consisting of silanol-terminated dimethylsiloxane oligomers, trimethylsiloxy-terminated methylhydrogensiloxane oligomers, 1,1,3,3-tetramethyldisiloxane, and 1,3,5,7-tetramethylcyclotetrasiloxane.

16. A composition according to claim 13, wherein the composition further comprises a surfactant and water.

17. A composition according to claim 13, wherein the composition further comprises a solvent.

18. A composition according to claim 17, wherein the solvent is selected from the group consisting of hexane, heptane, octane, methylcyclohexane, xylene, petroleum naphtha, perchloroethylene, bromochloroethane, dichlorobutane, triethylamine, butylamine, tributylamine, isopropyl alcohol, butyl alcohol, amyl alcohol, hexyl ether, butyl Cellosolve, dioxane, methyl ethyl ketone, diethyl ketone, and methyl butyl ketone, ethyl acetate, Cellosolve acetate, ethyl propionate, acetic acid, and propionic acid.

19. In a process of controlling foam, which includes the addition of an antifoam composition to a medium, the improvement which comprises using as the antifoam composition, the composition of claim 1.

20. In a process of controlling foam, which includes the addition of an antifoam composition to a medium, the improvement which comprises using as the antifoam composition, the composition of claim 13.

* * * * *